(12) United States Patent
Revaz et al.

(10) Patent No.: US 12,741,320 B2
(45) Date of Patent: Sep. 22, 2026

(54) METHOD FOR NON-DESTRUCTIVE TESTING OF REGIONS OF INTEREST OF A METAL PIECE DURING ADDITIVE MANUFACTURING

(71) Applicant: AMIQUAM SA, Gland (CH)

(72) Inventors: Bernard Revaz, Geneva (CH); Marc Lany, Rolle (CH); Gilles Santi, Lausanne (CH); Adriaan B Spierings, Wittenbach (CH); Marvin A Spurek, Zürich (CH)

(73) Assignee: AMIQUAM SA, Gland (CH)

( * ) Notice: Subject to any disclaimer, the term of this patent is extended or adjusted under 35 U.S.C. 154(b) by 449 days.

(21) Appl. No.: 18/260,826

(22) PCT Filed: Jan. 11, 2021

(86) PCT No.: PCT/IB2021/050151

§ 371 (c)(1),
(2) Date: Jul. 10, 2023

(87) PCT Pub. No.: WO2022/148997

PCT Pub. Date: Jul. 14, 2022

(65) Prior Publication Data

US 2024/0082924 A1 Mar. 14, 2024

(51) Int. Cl.
*B22F 10/85* (2021.01)
*B22F 10/31* (2021.01)
(Continued)

(52) U.S. Cl.
CPC .............. *B22F 10/85* (2021.01); *B22F 10/31* (2021.01); *G01N 27/904* (2013.01); *B33Y 30/00* (2014.12); *B33Y 50/02* (2014.12)

(58) Field of Classification Search
CPC .......... B22F 10/85; B22F 10/31; B22F 10/38; B22F 2999/00; B22F 10/47; B22F 10/80;
(Continued)

(56) References Cited

U.S. PATENT DOCUMENTS 8,214,161 B2 * 7/2012 Girndt .................. G01N 29/265 73/628
2015/0151492 A1 6/2015 Schmidt
(Continued)

FOREIGN PATENT DOCUMENTS

| | | | |
|---|---|---|---|
| EP | 3654030 | A1 | 5/2020 |
| WO | 2019092635 | A1 | 5/2019 |
| WO | 2020100022 | A1 | 5/2020 |

OTHER PUBLICATIONS

International Search Report issued in Application No. PCT/IB2021/050151 dated Oct. 5, 2021.
Written Opinion for PCT/IB2021/050151 dated Oct. 5, 2021.

*Primary Examiner* — Michael J Brown
(74) *Attorney, Agent, or Firm* — McDonald Hopkins LLC

(57) ABSTRACT

A method of monitoring metal pieces including generating, on a computing device, a 3D digital model of a metal piece to be produced by additive manufacturing; and identifying regions of interest in the model where defects are more likely to occur during manufacturing The regions of interest are identified using software to check the model according to specific design rules. N NDT sensors are either: selectively activated among a total of M NDT sensors, or mounted on a sensor supporting structure at specific locations along an axis. The N NDT sensors are selectively activated or mounted as a function of the regions of interest identified in the model to retrieve data on the properties of the quality of metal parts of the metal piece only for the
(Continued)

corresponding regions of interest of the metal piece during its additive manufacturing. Also, a system is configured to carry out the method.

39 Claims, 9 Drawing Sheets

(51) Int. Cl.

| | |
|---|---|
| ***B33Y 30/00*** | (2015.01) |
| ***G01N 27/904*** | (2021.01) |
| *B33Y 50/02* | (2015.01) |
| *G01R 33/028* | (2006.01) |

(58) Field of Classification Search

CPC .. B22F 12/67; B22F 2202/05; B22F 2202/07; B22F 12/90; G01N 27/904; G01N 27/902; B33Y 30/00; B33Y 50/02; B33Y 10/00; B33Y 50/00; G01R 33/028; Y02P 10/25

USPC .......................................................... 700/118

See application file for complete search history.

(56) References Cited

U.S. PATENT DOCUMENTS

| | | | | |
|---|---|---|---|---|
| 2018/0036964 | A1* | 2/2018 | DehghanNiri | G01N 27/9013 |
| 2020/0069282 | A1* | 3/2020 | Zhang | A61B 8/14 |
| 2020/0376751 | A1 | 12/2020 | Ferrar | |

* cited by examiner

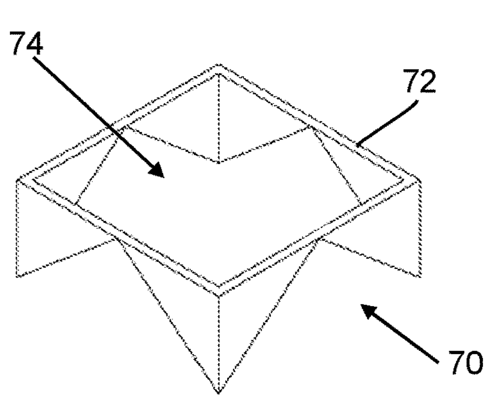
Fig. 12a
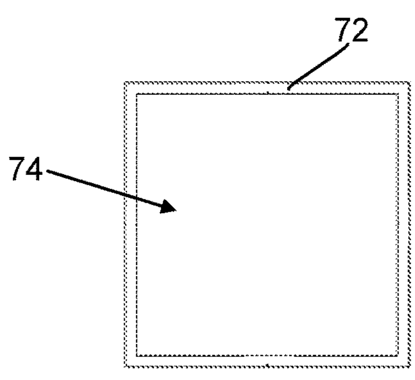
Fig. 12b
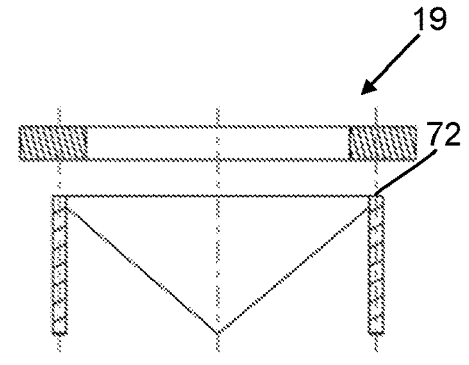
Fig. 13a
Fig. 13b
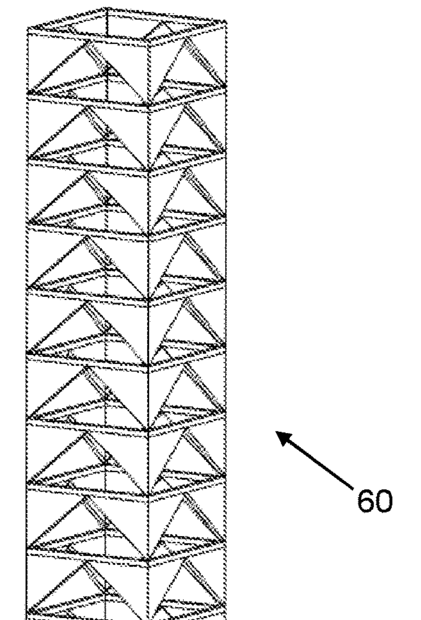
Fig. 14a
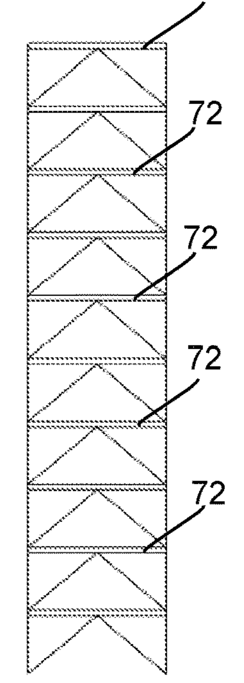
Fig. 14b

METHOD FOR NON-DESTRUCTIVE TESTING OF REGIONS OF INTEREST OF A METAL PIECE DURING ADDITIVE MANUFACTURING

FIELD OF THE INVENTION

The present invention relates to a method for non-destructive testing of regions of interest of metal pieces produced by additive manufacturing. The present invention also relates to an additive manufacturing system for non-destructive testing of regions of interest of a metal piece as well as a tangible computer product containing program code for causing a processor to execute the above method.

DESCRIPTION OF RELATED ART

The recent evolution of the domain of additive manufacturing (AM) provides excellent tools not only for rapid and cost-effective manufacturing of prototypes and products but also for a single on-demand component, for a pre-production series of components and for production of a limited number of components. In particular, there is an increasing interest in manufacturing high value-added components with complex geometries that are hard or impossible to manufacture with traditional machining. However, the control of the quality of these components that have to comply with given quality standards and technical requirements so as to allow a use in highly demanding and regulated application fields is still a challenge.

In an additive manufacturing process, a manufacturing anomaly (e.g. non-intended variation of the structural or material properties of the final manufactured component) could arise due to a mismatch or an unintended drift of manufacturing parameters, an inconsistency in the 3-dimension (3D) model of the component, an incorrect application of a material layer, a flaw in the material powder, or a bad thermal management resulting in hot spots and related geometrical or material defects.

Depending on the relevance and of the typology of the variation as well as depending on the applied quality standards and technical requirements, the manufacturing anomaly can represent either an acceptable imperfection or an unacceptable flaw (i.e. defect) which could potentially lead to a malfunction or a premature mechanical failure of the component.

As AM stakeholders are striving to reach the same level of quality standards as traditional machining, there is a lack of relevant standards, guidelines, and recommendations for stakeholders to rely on. The immature nature of AM technologies causes uncertainties and increased risk exposure for involved stakeholders. Hence, the qualification of processes becomes complicated and time consuming for all involved parties.

Certifications of AM product rely on a manufacturing procedure qualification process. The qualification process ensures that the method by which parts are processed can meet the qualifying criteria in a repeated manner. The aim of the qualification process is to identify the variables of the process in order to know their influence on the part performance and process reproducibility, thereby providing a correlation between product and process specifications to ensure adequate and consistent performance of parts of AM products.

Various monitoring strategies are implemented by machine manufacturers to ensure the stability of the process. Among them, performing a layer-by-layer control of the build job using an NDT technique is an attractive approach to address the above challenges. This approach is described in several patents such as in WO2020/100022. A layer-wise surface scan with full coverage of the build area presents yet some drawbacks.

A layer-wise surface scan with full coverage of the build area is indeed costly and resource consuming in terms of power, data transfer rate, file size, etc. whereas most of the data of the scanned layers are not useful, as only a fraction of the layer information representing the manufactured cross-section part may comprise regions of interest that are more likely to present defects than the remaining cross-section part.

In addition, a full coverage scanning technology discloses the details of the internal geometry of the part to a third party that would review the NDT information which raises confidentiality issues with regard to the know-how of the manufacturer, thereby facilitating the unwanted reverse-engineering of the additive manufactured part by a competitor.

An aim of the present invention is, therefore, to provide a non-destructive method for certification of AM products that overcomes the shortcomings and limitations of the state of the art.

More particularly, an aim of the present invention is to provide a non-destructive testing method for certification of AM products or parts which keeps the part designed and the know-how of manufacturers confidential.

Another aim of the present invention is to provide a non-destructive testing method which advantageously streamlines the certification process of AM products.

A further aim of the present is to provide a method to provide a non-destructive method for monitoring AM products that is resource-efficient.

BRIEF SUMMARY OF THE INVENTION

According to the invention, these aims are achieved, according to an aspect of the invention, by a method of monitoring metal pieces produced by an additive manufacturing system. The system comprises a build platform, a material dispensing mechanism to dispense metallic powder on the build platform, and a sensor supporting structure configured to move across the build platform. N or M NDT sensors are mounted on the sensor supporting structure next to each other along an X-axis substantially perpendicular to the direction of the displacement of the supporting structure along a Y-axis. The method comprises the steps of:

- generating, on a computing device, a 3D digital model of at least one metal piece to be produced by the additive manufacturing system;
- identifying regions of interest in the 3D digital model where defects are more likely to occur during the additive manufacturing of said at least one metal piece. The regions of interest are identified using software configured to check the 3D digital model according to specific design rules. N NDT sensors are configured to be either:
- selectively activated among a total of M NDT sensors, or
- mounted on the sensor supporting structure at specific locations along said axis (X-axis).
- The N NDT sensors are selectively activated or mounted on said specific locations as a function of the regions of interest identified in the 3D digital model in order to retrieve data on the properties of the quality of metal parts of the metal piece only for the corresponding regions of interest of the metal piece during its additive manufacturing.

In an embodiment, the N NDT sensors are selectively activated or mounted on said specific locations also as a function of the position of the sensor supporting structure on the build platform.

In an embodiment, the N NDT sensors are selectively activated or mounted on said specific locations also as a function of the position on the build platform where the at least one metal piece is to be manufactured and as a function of the build layer.

In an embodiment, the method further comprises generating at least one 3D digital model of a functionalized support supporting a part of the 3D digital model of the metal piece. The functional support comprises a plurality of control geometries having different build layers at different heights. The material property of each control geometry, once produced by additive manufacturing, is representative of the material property of a corresponding region of interest the metal piece supported by the functionalized support, said region of interest belonging to the same build layer of the corresponding control geometry.

In an embodiment, the functionalized support extends in the Z-direction during the additive manufacturing process. N NDT sensors are fixedly mounted on the supporting structure next to each other at a location along said axis to be aligned with the functionalized support in order to sense the control geometries during its additive manufacturing.

In an embodiment, the manufacturing system further comprises a multiplexer configured to selectively activate N NDT sensors among said M NDT sensors mounted on the sensor supporting structure, and a control unit configured to control the multiplexer, during the additive manufacturing of the metal piece, as a function of:

the identified regions of interest, the position of the sensor supporting structure on the build platform, and the build layer of the metal piece being manufactured.

In an embodiment, M is at least 100 and N is comprised between 2 and 32, preferably between 4 and 16 and N varies for each layer or for some layers constituting the metal piece.

In an embodiment, the control unit comprises a processor. The 3D digital model of the metal piece to be produced is converted into a build job file comprising data of identified regions of interest in the form of program codes. The build job file is sent from the computing device to the control unit to be executed by the processor for causing the control unit to control the multiplexer as a function of the identified regions of interest and as a function of the position of the sensor supporting structure on the build platform.

In an embodiment, the additive manufacturing system further comprises a calibration standard positioned in the manufacturing system such that said sensor supporting structure may move above the calibration standard. The method further comprises moving the sensor supporting structure one or more times during the additive manufacturing of the at least one metal piece to retrieve one or more calibration data for each of the N NDT sensors.

In an embodiment, the calibration standard comprises one or more calibration features adapted to the type of NDT sensors used. The one or more calibration features either:

continuously extend(s) along a direction parallel to the X-axis of the sensor supporting structure, or are distinct and identical calibration features positioned along said direction in correspondence with the position of the N NDT sensor.

Each of the N NDT sensors of a given type of the sensor supporting support may therefore sense identical characteristics when the sensor supporting support moves across the calibration standard.

In an embodiment, the one or more calibration features comprise at least a first and a second portion having respectively a first and a second conductivity that are different.

In an embodiment, the one or more calibration features comprise machined features with at least one characteristic dimension below 0.2 mm, such as a notch, a step, or a hole.

In an embodiment, the additive manufacturing system further comprises a material dispensing platform comprising a bed of metallic powder. The sensor supporting structure is a recoater configured to move the metal powder from the material dispensing platform over the build platform layer by layer. The calibration standard is positioned in the manufacturing system such that the recoater may move above the calibration standard. The method further comprises, during the additive manufacturing of the metal piece, the following step:

moving the recoater one or more times above the calibration standard during the formation of one or more powder layers on the build platform, or moving the recoater one or more times beyond the build platform above the calibration standard after the formation of one or more corresponding layers.

One or more calibration data may therefore be retrieved for each of the N NTD sensors.

In an embodiment, the additive manufacturing system further comprises a discharge opening positioned between the build platform and the calibration standard. The method comprises moving the recoater further along the Y-axis across the discharge opening to remove the excess of metallic powder for each additional layer spreads across the build platform and, moving the recoater even further, beyond the build platform, one or more times along the Y-axis to position the NDT sensors above the calibration standard during the additive manufacturing of the at least one metal piece in order to retrieve one or more calibration data for each of the N NTD sensors.

In an embodiment, the calibration standard is either forming an integral part with the build platform or removably included in the build platform. The top surface of the calibration standard is substantially coplanar with the build platform surface.

In an embodiment, N NDT sensors are eddy current sensors.

Another aspect of the invention relates to an additive manufacturing system for additive manufacturing of at least one metal piece and for monitoring the metal piece. The system comprises:

a build platform actuable along a vertical axis and on which the at least one metal piece is to be manufactured, a material dispensing mechanism for dispensing metallic powder on the build platform, and a sensor supporting structure configured to move across the build platform.

N or M NDT sensors are mounted on the supporting structure next to each other along an axis substantially perpendicular to the direction of the displacement of the sensor supporting structure. N NDT sensors are configured to retrieve data on the properties of the quality of metal parts of the metal piece corresponding of the regions of interest identified by the method as described above.

In an embodiment, the system further comprises a material dispensing platform comprising a bed of metallic powder. The sensor supporting structure is a recoater configured to move the metallic powder from the material dispensing platform over the build platform layer by layer.

In an embodiment, the system further comprises a discharge opening for discharging the excess of metallic powder and a calibration standard. The discharge opening is positioned between the build platform and the calibration standard such that the recoater is arranged to move across the discharge opening to remove the excess of metallic powder and then above the calibration standard.

In an embodiment, M is at least 100 NDT sensors arranged in the recoater. The system further comprises a multiplexer configured to selectively activate N NDT sensors among said at least 100 NDT sensors, a control unit configured to control the multiplexer and a measurements unit connected to the multiplexer to retrieved data on the property of the quality of metal parts of the at least one metal piece corresponding to the selected regions of interest of the at least one metal piece.

In an embodiment, the M NDT sensors are eddy-current sensors.

Another aspect of the invention relates to a tangible computer product containing a build job file in the form of program codes to be executed by the processor of the method as described above.

Another aspect of the invention relates to a method of monitoring metal pieces produced by an additive manufacturing system comprising a build platform, a material dispensing mechanism to dispense metallic powder on the build platform, a sensor supporting structure configured to move across the build platform, and a build volume. N or M NDT sensors are mounted on the supporting structure next to each other along an axis substantially perpendicular to the direction of the displacement of the sensor supporting structure. The method comprises the steps of:

- generating, on a computing device, a 3D digital model of the build volume and a 3D digital model, in the build volume, of at least one metal piece to be produced by the additive manufacturing system;
- selecting empty regions in the build volume, wherein each empty region has a volume larger than $10\times10\times10$ mm$^3$, and
- generating 3D digital models of control geometries in the empty regions.
- N NDT sensors are configured to be either selectively activated among a total of M NDT sensors, or mounted on the sensor supporting structure at specific locations along said axis. The N NDT sensors are selectively activated or mounted on said specific locations as a function of the position of the 3D digital models of control geometries in the corresponding empty regions of the 3D digital model of the build volume and as a function of the position on the build platform where the control geometries are to be manufactured. Data on the properties of the quality of metal parts of the control geometries may therefore be retrieved during their additive manufacturing without directly sensing the at least one metal piece during its additive manufacturing.

In an embodiment, at least one of the 3D models of control geometries comprises a closed conductive portion surrounding an empty space. The closed conductive portion may have a regular width within a building plane. The thickness of said width is equal or thinner than the thickness of the thinnest portion of the 3D digital model of the at least one metal piece.

In an embodiment, the NTD sensors are eddy current sensors comprising each a coil generating a time-varying electromagnetic field within the range from 1 kHz to 10 MHz. The coil's sensing size characteristics are substantially identical to the dimensions of the closed conductive portion of the control geometry when the coil is oriented in the building direction of the control geometry.

In an embodiment, the 3D digital models of control geometries have a maximum thickness of one millimetre and the corresponding manufactured control geometries are made of one or more layers selected from 1 to 30.

In an embodiment, each control geometry has at least one support structure linking said control geometry to the build plate. The support structure has on average a total sectional area in the build direction of no more than 30% of that of the reference geometry.

Another aspect of the invention relates to a method of monitoring metal pieces produced by an additive manufacturing system comprising a build platform, a material dispensing mechanism to dispense metallic powder on the build platform, a sensor supporting structure configured to move across the build platform, and a build volume. N or M NDT sensors are mounted on the supporting structure next to each other along an axis substantially perpendicular to the direction of the displacement of the sensor supporting structure. The method comprising the steps of:

- generating, on a computing device, a 3D digital model of the build volume comprising at least one metal piece to be produced by the additive manufacturing system and one or more support structures supporting one or more parts of the at least one metal piece, and
- including in at least one support structure at least one control geometry.
- N NDT sensors are configured to be either selectively activated among a total of M NDT sensors, or mounted on the sensor supporting structure at specific locations along said axis. The N NDT sensors are selectively activated or mounted on said specific locations as a function of the location of the control geometries in one or more of the support structures in the 3D digital model of the build volume in order to retrieve data on the properties of the quality of the control geometries included in at least one support structure during its manufacturing.

In an embodiment, the N NDT sensors are selectively activated or mounted on said specific locations also as a function of the position of the sensor supporting structure on the build platform.

Another aspect of the invention relates to a method of monitoring metal pieces produced by an additive manufacturing system comprising a build platform, a material dispensing mechanism to dispense metallic powder on the build platform, a sensor supporting structure configured to move across the build platform, and a build volume. NDT sensors are mounted on the supporting structure along an axis substantially perpendicular to the direction of the displacement of the sensor supporting structure. The method comprises the steps of:

- generating, on a computing device, a 3D digital model of the build volume comprising at least one metal piece to be produced by the additive manufacturing system,
- identifying regions of interest in the 3D digital model of the at least one metal piece where defects are more likely to occur and/or are more critical during the additive manufacturing of said at least one metal piece, wherein the regions of interest are identified using software configured to check the 3D digital model according to specific design rules, and modifying in the 3D digital model of the build volume the position and/or orientation of the 3D digital model of the at least one metal piece so as to maximize the number of regions of interest that are located on an axis parallel to the X-axis of the sensor supporting structure before starting the additive manufacturing of the at least one metal piece.

N NDT sensors are configured to be either selectively activated among a total of M NDT sensors, or mounted on the sensor supporting structure at specific locations along said axis. Data of the properties on the quality of metal parts may therefore be retrieved for an optimized number of corresponding regions of interest of the metal piece during its additive manufacturing.

Another aspect of the invention relates to a method of monitoring metal pieces produced by an additive manufacturing system comprising a build platform, a material dispensing mechanism to dispense metallic powder on the build platform, a sensor supporting structure configured to move across the build platform, and at least one NDT sensor affixed to the sensor supporting structure. The NDT sensor moves above a calibration standard several times during the additive manufacturing of a metal piece in order to retrieve a calibration dataset associated with an additive manufacturing run.

In an embodiment, the height of the top surface of the calibration standard is within +/−5 mm of the Z position of the plane corresponding to the upper surface layer formed by the material dispensing mechanism.

In an embodiment, the calibration standard is either forming an integral part with the build platform or removably included in the build platform. The top surface of the calibration standard is substantially coplanar with the build platform surface.

In an embodiment, the calibration standard is marked with a unique identifier that is visible and/or readable through electromagnetic means.

In an embodiment, the NDT sensor is an optical sensor.

In an embodiment, the NDT sensor is an eddy current sensor.

In an embodiment, the calibration standard comprises regions with different conductivities.

In an embodiment, the calibration standard comprises machined features with at least on characteristic dimension below 0.2 mm, such as a notch, a step, or a hole.

In an embodiment, a powder evacuation opening or recess is located between the build platform and the calibration standard.

BRIEF DESCRIPTION OF THE DRAWINGS

The invention will be better understood with the aid of the description of several embodiments given byway of examples and illustrated by the figures, in which:

FIG. 12*a* shows a perspective view of another example of a control geometry;

FIG. 12*b* shows a top view of FIG. 12*a;*

FIG. 13*a* shows a perspective view of another example of a control geometry;

FIG. 13*b* shows a cross-section view of FIG. 13*a* together with a cross-section of a coil of an eddy-current sensor;

FIG. 14*a* shows a perspective view of a functionalized support integrating control geometries, FIG. 14*b* shows a side view of FIG. 14*a;*

DETAILED DESCRIPTION OF POSSIBLE EMBODIMENTS OF THE INVENTION

In the context of the present invention, a metal piece shall be understood as a piece substantially made of metal as such piece may be made of metallic powder either sintered/welded using the SLM technology or held together by a non-metallic binding agent using the binder jetting technology.

In addition, specific design rules in the context of the present invention shall be understood as rules providing direct guidelines or constraints in relation to part designs, process parameters, and material properties. AM technologies provide tremendous flexibility for designers because of the wide range of complex geometries that they can produce. For this reason, design rules in AM are desired because they can provide much-needed insight into manufacturability for a particular material, design, or process. That insight leads to an understanding of direct guidelines or constraints during process planning. Design rules can be critical to satisfying manufacturability because they enable designers to determine the best process and material combinations for a design. The skilled person knows how to select design rules as a function of the geometry of the metal piece to be manufactured and the process parameters associated with a particular additive manufacturing system.

Further, in the context of the present invention, a build job file may include not only data on the shape of the metal piece to be produced but also, data pertaining to the position/orientation of the metal piece on the build platform. Real-time information on the relative position between the metal piece being produced and the sensor supporting structure may however require additional data to be fed to the controller of the supporting structure of the additive manufacturing system to take into consideration non-constant travel speed of the sensor supporting structure as described subsequently.

Furthermore, a build layer as described therein shall be understood as a layer index, i.e. a specific layer of multiple layers constituting the metal piece produced by the additive manufacturing process.

Figure 1:
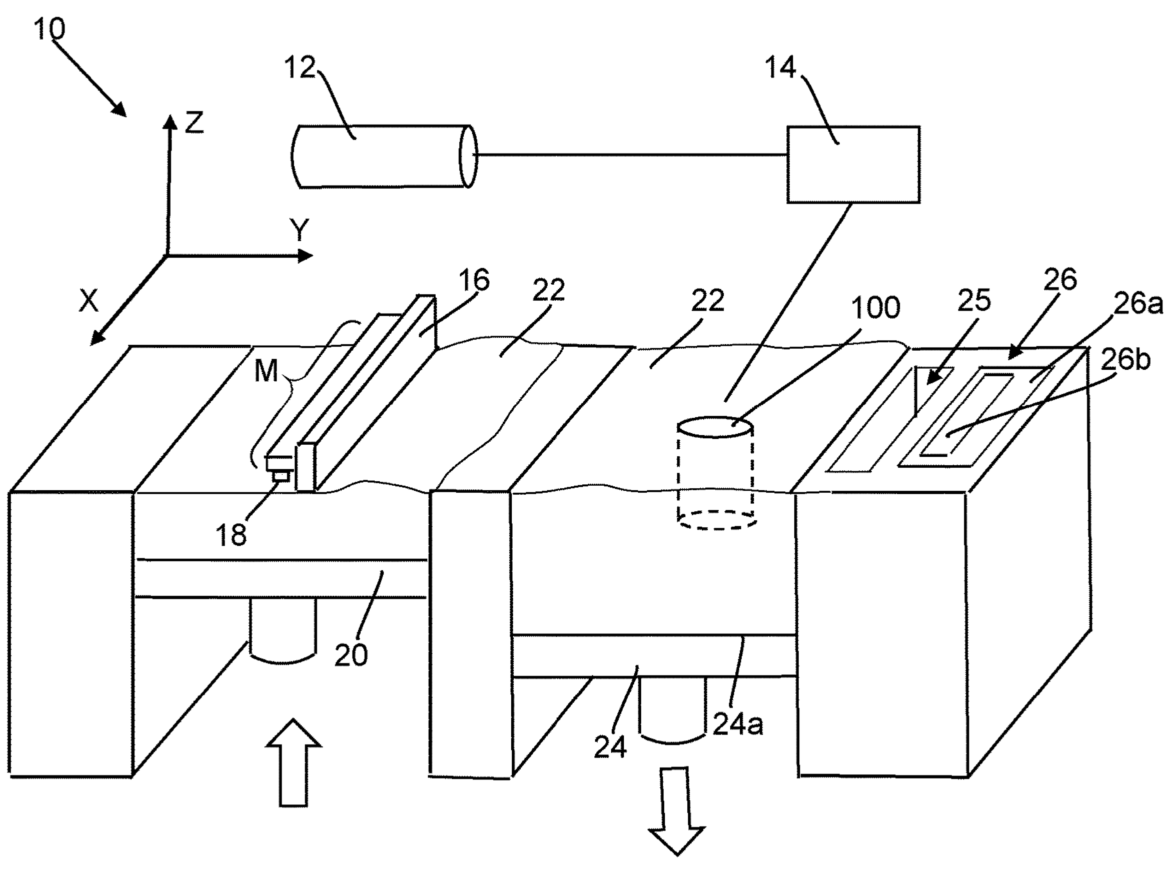
FIG. 1 schematically shows a perspective view of an SLM machine according to an embodiment of the invention

Referring to FIG. 1, additive manufacturing of a metal piece 100 is produced by a Selective Laser Melting (SLM) system 10 according to an embodiment of the invention. This technique can be used for the additive manufacturing of stainless steel, tool steel, titanium, cobalt chrome, and aluminum parts. Other additive manufacturing systems based on other AM technologies may be used within the context of the present invention such as binder jet 3D printing systems.

The SLM machine 10 comprises a material dispensing platform 20 configured to move upwardly during additive manufacturing, a metal powder bed 22 on the dispensing platform 20, a build platform 24 configured to move downwardly during additive manufacturing and a recoater 16 configured to move metal powder layer by layer from the dispensing platform 20 to the build platform 24. There are however other solutions to dispense the metal powder on the build platform, for example by a container mounted on an upper portion of the recoater and adapted to dispense metal powder on the build platform 24 as the recoater 16 moves across the platform.

Figure 3:
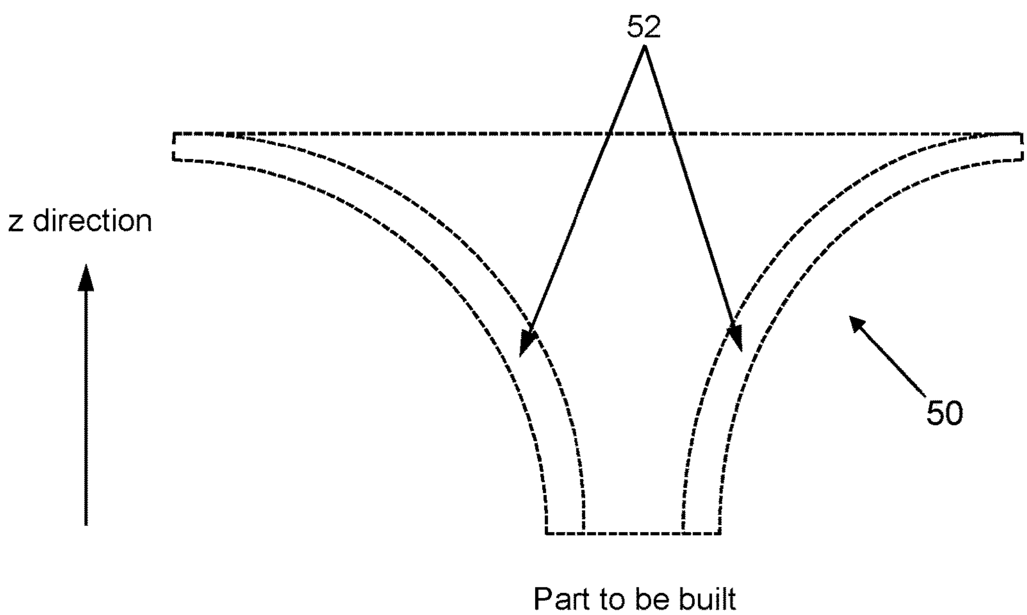
FIG. 3 shows a 3D model of a metal piece to be manufactured with regions of interest.
Figure 5:
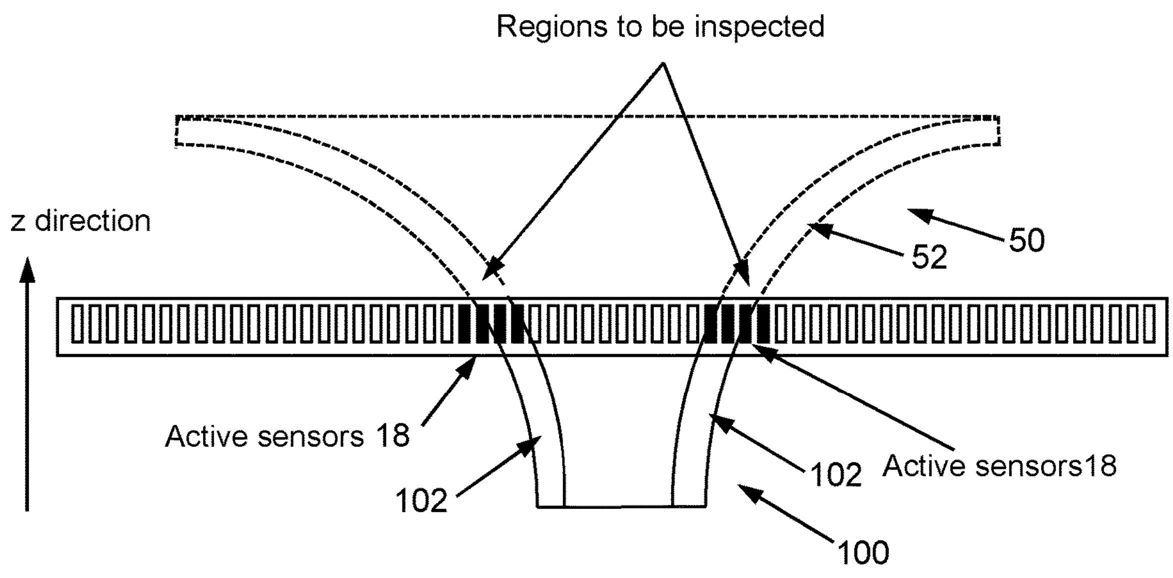
FIG. 5 is a similar view of FIG. 4 during the additive manufacturing process with the NDT sensors of the recoater selectively activated for monitoring the regions of interest as a function of the Z-direction of the recoater.

The SLM machine 10 comprises a laser source 12 and a mirror scanner 14 configured to move laser beams over each layer of metal powder to fuse portions of said layer of metal powder as a function of a 3D digital model 50, as shown in FIG. 3, previously generated by an AM design software program in order to produce a metal piece 100 according to the 3D digital model 50 as illustrated in FIG. 5.

AM design software packages usually comprise a module that can be used to perform numerical simulation using the 3D digital model of the metal piece to be manufactured and manufacturing parameters. The software is therefore capable of simulating for example mechanical stresses as wells as thermal stresses on the 3D digital model 50 of a specific shape as a function of the design rules associated with this specific shape and with the parameters of the additive manufacturing system 10 in order to identify regions of interest that are more likely to present defects which could affect the overall quality of the metal piece 100. More particularly, the region of interest may be identified as a function of the response to mechanical and/or thermal stresses exceeding a given threshold. The threshold may be determined according to the field of application of the metal piece.

For example, the threshold may be set at a low value for metal pieces intended to be used in a combustion engine as there are subject to very high mechanical and thermal stresses. If the response affects the integrity of the metal piece to a degree that could potentially lead to a malfunction or a premature mechanical failure of the metal piece, the 3D digital model is adapted to provide a more robust metal piece capable to withstand high mechanical and thermal stresses in the long-term.

Figure 2:
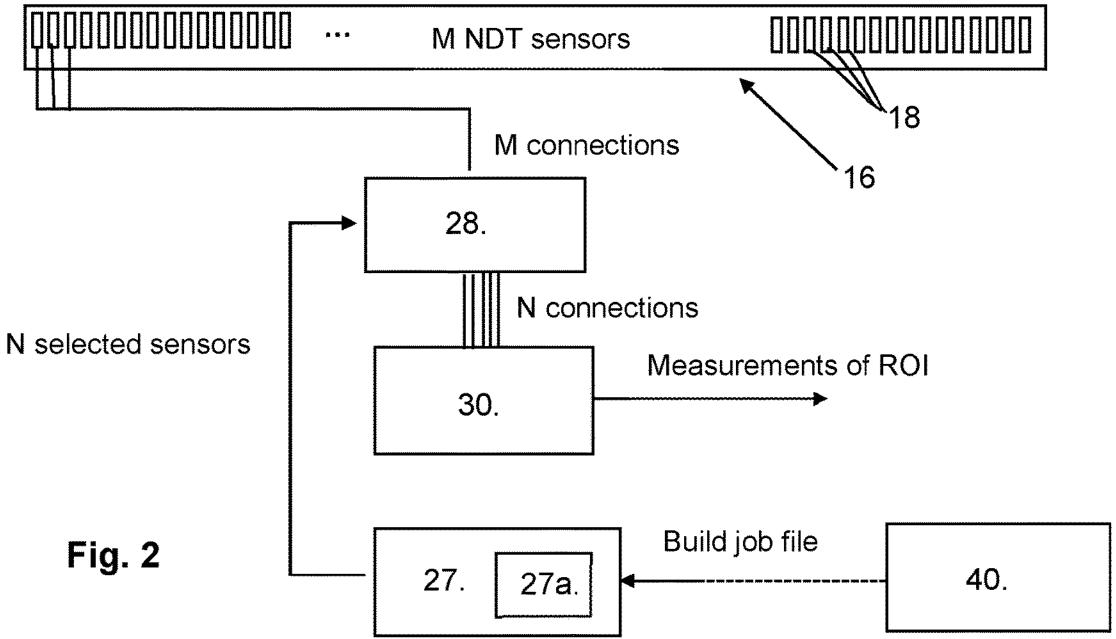
FIG. 2 shows a block-diagram for selectively controlling the NDT sensors of the recoater.

Referring to FIG. 2, which illustrates an advantageous embodiment, M NDT sensors 18 are mounted on the recoater 16 next to each other along an axis (X-axis) perpendicular to the direction of displacement of the recoater (Y-axis) as shown in FIG. 1. The number of NDT sensors 18 on the recoater 16 is preferably above 50, preferably above 80, even more preferably above 100. In another non-illustrated embodiment, the NDT sensors 18 may be mounted on a sensor supporting structure which is independent of the recoater. The sensors 18 are arranged next to each other along an axis (Y-axis) substantially perpendicular to the direction of the displacement of the sensor supporting structure across the build platform.

The NDT sensors 18 may be selected for example among: an eddy current sensor, a temperature-sensitive sensor, a capacitive sensor, an optical sensor comprising an optical sensing element sensitive to visible and/or infrared (IR) and/or ultraviolet (UV) radiations, and a laser sensing system able to generate and detect ultrasonic waves.

In an advantageous embodiment, M eddy current sensors 18 are mounted on the recoater 16 next to each other, as described above, in order to be able to sense newly solidified cross-section of the metal piece being manufactured as the recoater 16 moves across the build platform 24 to spread another layer of metallic powder. Each eddy current sensor 18 may be configured to generate an excitation magnetic field with a single, given excitation frequency. The eddy current sensor 18 is configured to create a time-varying, local magnetic field and to measure the induced magnetic field response, or field variations response in a localized manner. The material properties of a portion of a newly solidified cross-section, which is sensed by the eddy current sensor 18 during the additive manufacturing of a metal piece, are a function of the electromagnetic properties of the sensed portion, such as its electrical conductivity and magnetic permeability, that depend on the integrity and of the particular shape of the sensed portion (absence of crack or non-uniformity within the solidified mass).

An eddy current sensing array, made of multiple eddy current sensors 18, can be configured in an absolute or send receive mode. A plurality of interrogating frequencies can be used for each coil to better separate surface and sub-surface defects. A plurality of geometries, such as larger (>3 mm) and smaller coils (0.5 mm<x<3 mm), can be used to increase the magnetic field penetration or the local resolution.

Each eddy current sensor 18, or each of any other type of NDT sensors mentioned above may sense a portion of a cross-section of the metal piece 100 in the course of its manufacturing process. The sensed portion may be less than 3 mm×3 mm×PD, and advantageously less than 1 mm×1 mm×PD, wherein PD is the electromagnetic penetration depth ("skin" depth). The arrangement of the NDT sensors 18 on the recoater 16 may therefore sense, in high resolution, entire cross-sections of the metal piece 100 to be inspected.

However, as mentioned earlier, sensing entire cross-sections of the metal piece 100 is not desirable as not only it raises confidentially issues on the know-how of the manufacturer without having necessarily more accurate information on the integrity of the metal piece, but it is also resource-consuming in terms of power, data transfer rate, file size, etc.

To address these issues, with reference to FIG. 2, the additive manufacturing system 10 further comprises a control unit 27, a multiplexer 28 connected to the control unit 27 and a measurements unit 30 connected to the multiplexer 28. M outputs of the multiplexer 28 are electrically connected to respective M NDT sensors 18 while N inputs of the multiplexer 28 are electrically connected to the measurement unit 30 to retrieved data on the material property of the selected regions of interest 102 of the metal piece 100 as shown in FIG. 5.

The control unit 27 comprises a processor 27*a* configured to execute a build job file sent by a remote computing device 40 through the internet 200 or by an in-situ computing device 45 located nearby the additive manufacturing system (FIG. 17) in order to cause the control unit 27 to control the multiplexer 28 for selectively activating N sensors 18 as a function of the selected regions of interest 52 and the position of the recoater 16 on the Y axis and optionally on the X axis.

The control unit 27 of the additive manufacturing system therefore constantly controls the multiplexer 28 as a function of both the regions of interest 102 to be inspected and the position of the recoater 16 as it moves along the Y-direction and possibly along the X-direction during the additive manufacturing process of the metal piece 100. In this respect, the additive manufacturing system 10 may comprise sensors positioned to measure in real-time the position or the travel speed of the recoater 16. Position or speed data may be fed to the control unit 27 to control the multiplexer as to ensure that each sensor 18 is timely activated to sense the intended region of interest of the metal piece.

Figure 4:
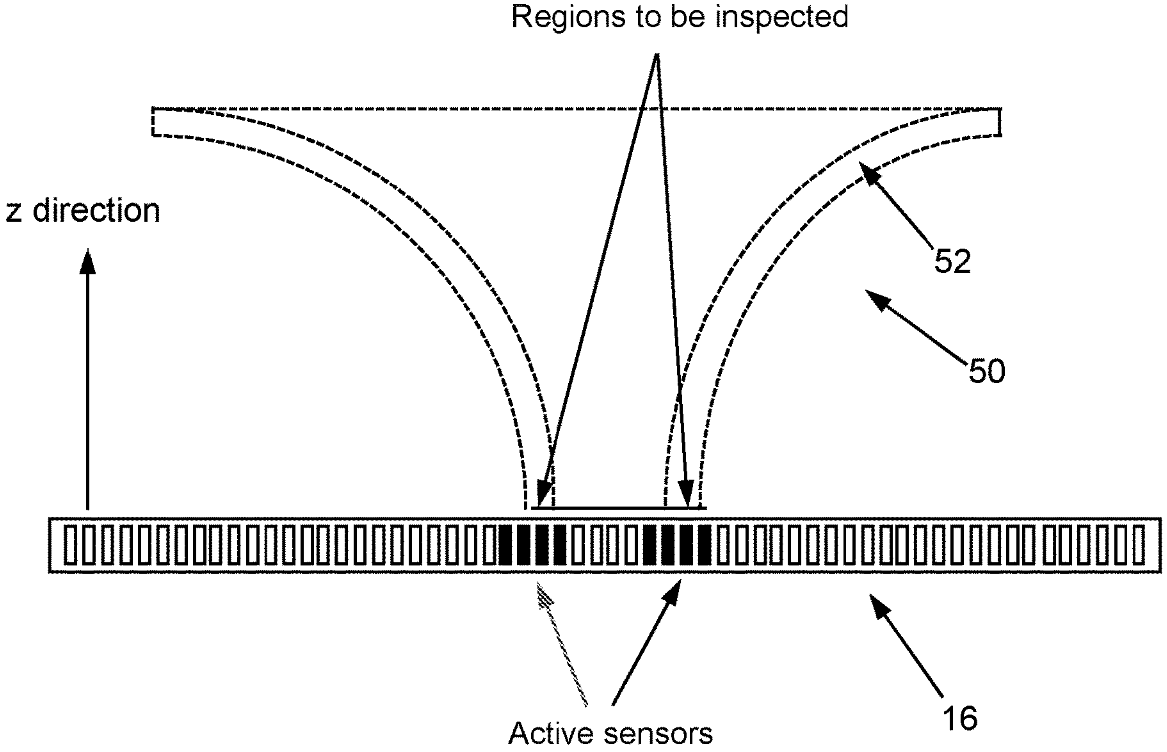
FIG. 4 shows an elevation view of the metal piece to be produced by additive manufacturing with the recoater position just before starting the additive manufacturing process.

FIGS. 3 to 5 shows an example of the additive manufacturing process of a metal petal piece 100. In particular, FIG. 3 shows the 3D model 50 of the metal piece to be produced. The 3D model comprises two lateral parts with cantilevered portions that have been selected as regions of interest 52 as they are more likely to present defect by the nature of their respective shape.

Referring to FIG. 4, at the start of the additive manufacturing of the metal piece, the control unit 27 of the additive manufacturing system 10 control the multiplexer 28 based on the build job file executed by the processor 27*a* so as to selectively activate N NDT sensors 18 which are aligned with the base of the selected regions of interest 52.

As the additive manufacturing of the metal piece 100 progresses as shown in FIG. 5, the control unit 27 constantly control the multiplexer 28 to activate and deactivate the corresponding NDT sensors to ensure that only the regions of interest 102 of the metal piece, corresponding to the regions of interest 52 of the 3D digital model, are inspected.

The signal sensed by each NDT sensor 18 for the identified regions of interest of the metal piece 100 during its additive manufacturing are processed as a function of the movement of the NDT sensors, which correspond to the movement of the recoater 16 when the NDT sensors are mounted thereon according to an embodiment.

In particular, time difference, for each build layer and for each sensor, between the instant t0 corresponding to the beginning of the displacement of each NDT sensor in the Y direction and the instant t1 corresponding to the instant when a sensor senses a region of interest is timestamp. Timestamp for each measurement of regions of interest are then processed as a function of position data which can be obtained either from the motion controller of the recoater or from a dedicated device in order to assign for each region of interest the corresponding measurement.

In another non-illustrated embodiment, N NDT sensors are mounted on the recoater, or on a sensor supporting structure independent of the recoater, next to each other along an axis (X-axis) substantially perpendicular to the direction of the displacement of the recoater (Y-axis) or along an axis (X-axis) substantially perpendicular to the direction of the displacement of the supporting structure (Y-axis). Each NDT sensor is positioned at a specific location on the recoater or on the sensor supporting structure as a function of the regions of interest 52 identified in the 3D digital model as described above.

It may however be difficult to measure the material property with NDT sensors for a metal piece comprising specific parts whose defects are poorly measured by NDT techniques, such as thin walls or lattice-structure. For metal pieces comprising parts that need to be supported during the additive manufacturing, such as cantilevered parts 102, a functionalized support 60 may be used as illustrated in FIG. 6 according to an embodiment.

In this embodiment, NDT sensors 18 are fixedly positioned on the recoater 16 to be aligned with the functionalized support 60. These sensors may sense only a cross-section of control geometries 70*a*, 70*b*, 70*c*, 70*d*, 70*e*, 70*f* integrated in the functionalized support 60 at different build layers at different heights along the Z-direction during the inspection of the functionalized support 60. Only a few NDT sensors are required to inspect the support 60 and may be comprised for example between 2 and 6.

Figure 6:
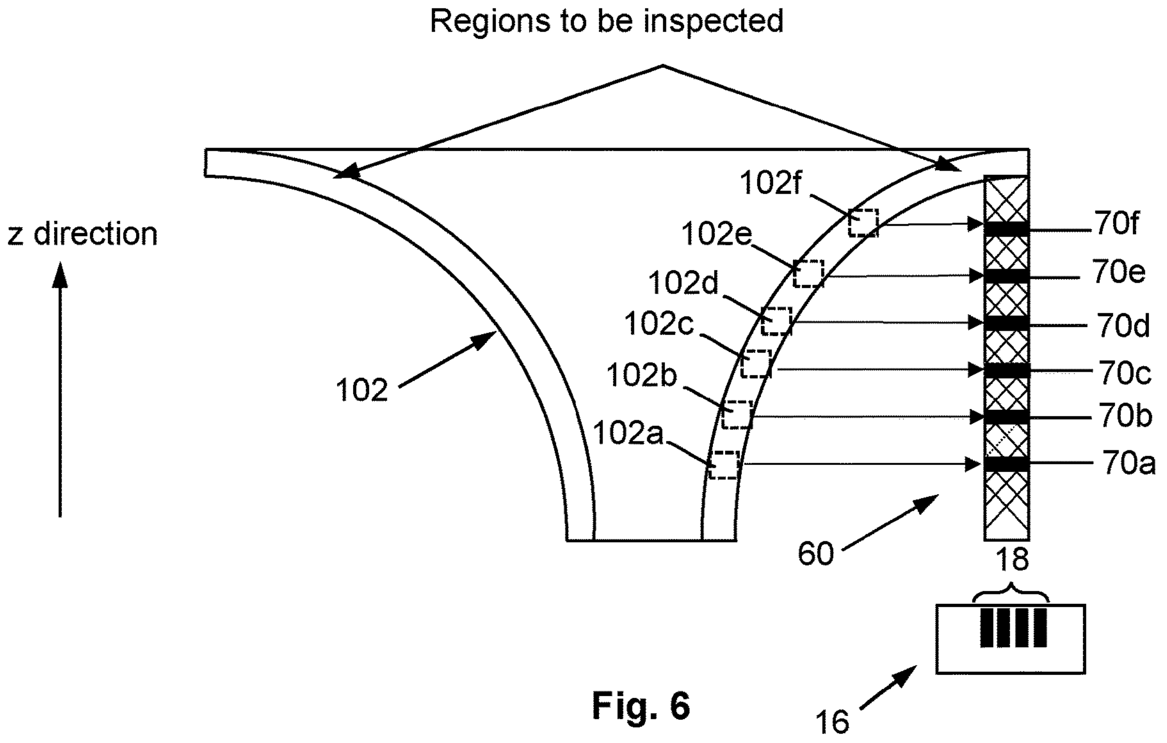
FIG. 6 shows an elevation view of the metal piece to be produced together with a functionalized support by additive manufacturing with the recoater positioned just before starting the additive manufacturing process according to another embodiment of the invention.
Figure 7:
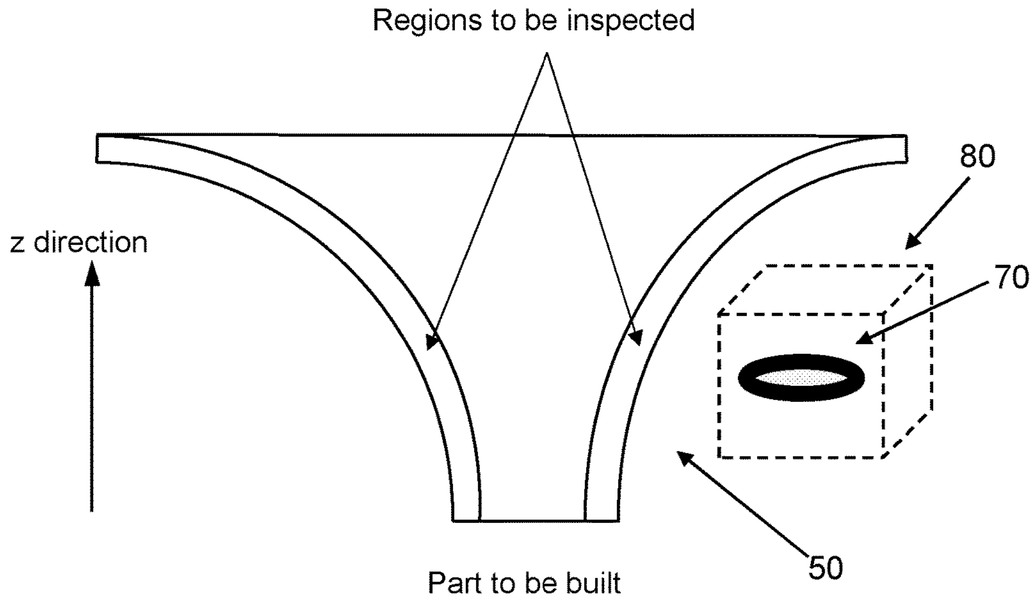
FIG. 7 shows an elevation view of the metal piece to be produced together with a control geometry.
Figure 8:
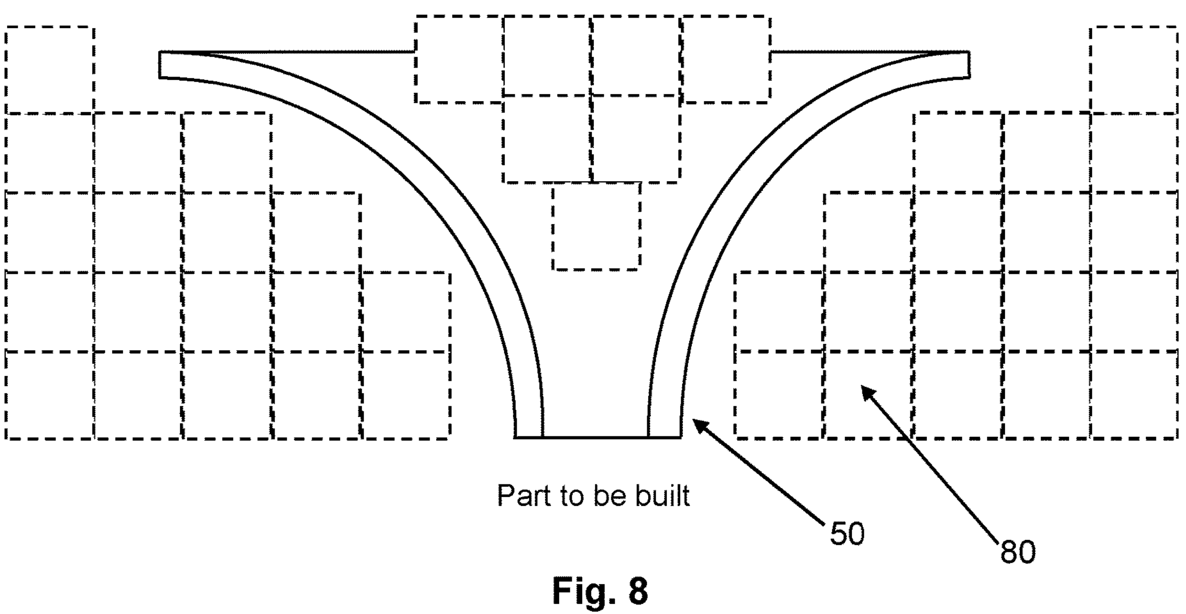
FIG. 8 shows an elevation view of the metal piece to be produced in a build volume with empty regions.
Figure 9:
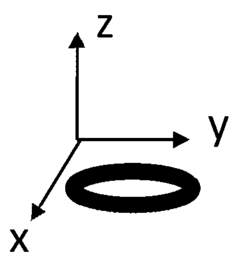
FIG. 9 shows different examples of shapes and orientations of control geometries that may be fitted into the empty regions of the build volume of FIG. 8. The control geometries are represented as flat and aligned with the axes of the machine for clarity although control geometries may comprise out-of-plane bends, for example thin sections extending along an axis forming an angle relative to XY plane substantially equal to the minimum overhang angle achievable by the additive manufacturing system without supporting structures.
Figure 9:
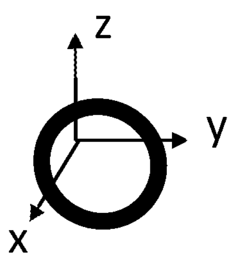
Figure 9:
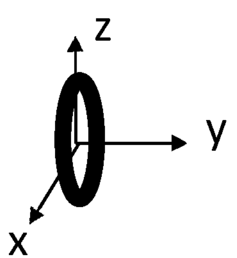
Figure 9:
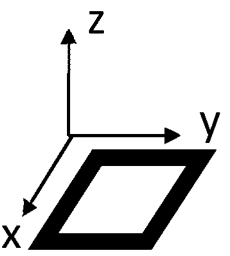
Figure 9:
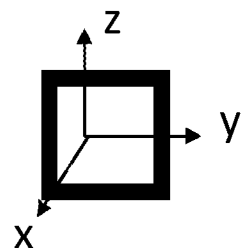
Figure 9:
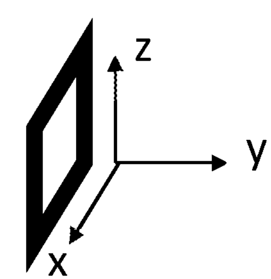
Figure 10A:
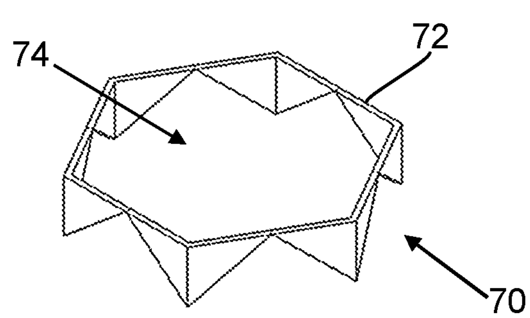
FIG. 10*a* shows a perspective view of an example of a control geometry.
Figure 10B:
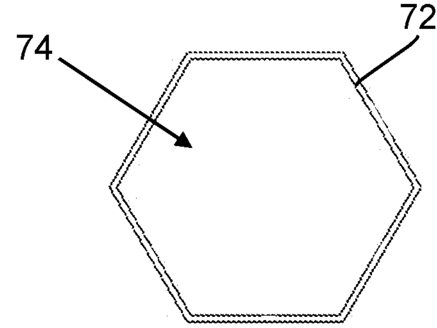
FIG. 10*b* shows a top view of FIG. 10*a;*
Figure 11A:
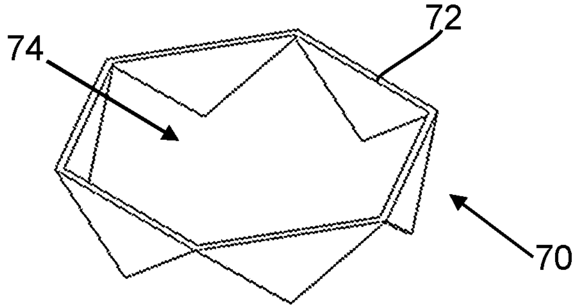
FIG. 11*a* shows a perspective view of another example of a control geometry.
Figure 11B:
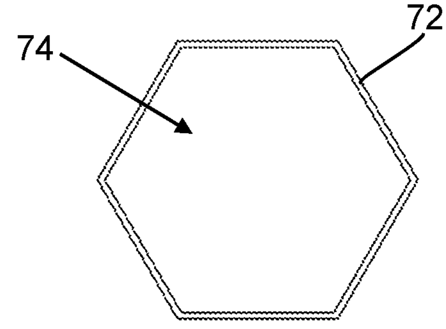
FIG. 11*b* shows a top view of FIG. 11*a;*
Figure 15A:
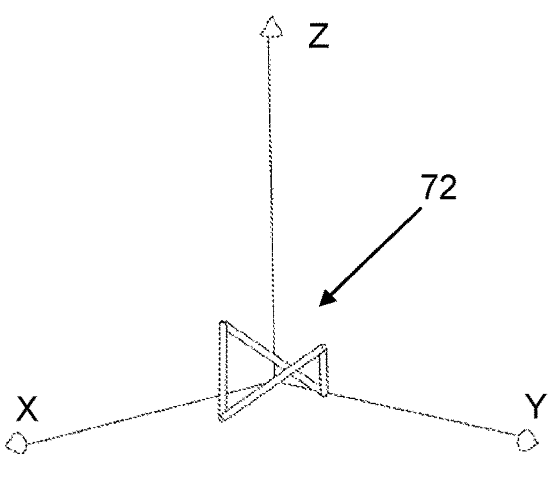
FIG. 15*a* shows a perspective view of a closed loop conducting portion of a control geometry.
Figure 15B:
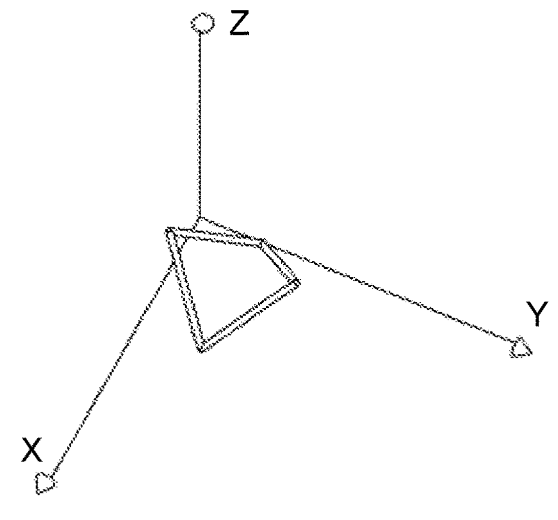
FIG. 15*b* shows another perspective view of the closed loop conducting portion of FIG. 15*a;*
Figure 15C:
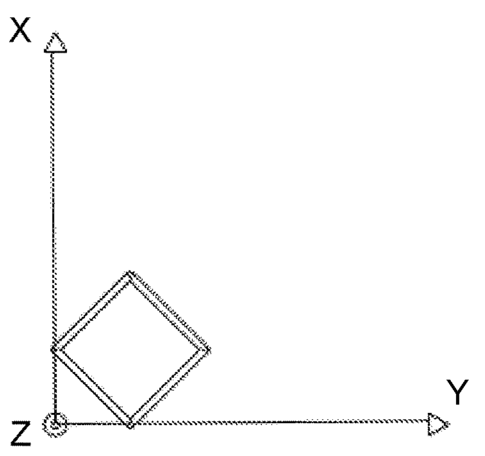
FIG. 15*c* shows a top view of FIGS. 15*a* and 15*b;*
Figure 15D:
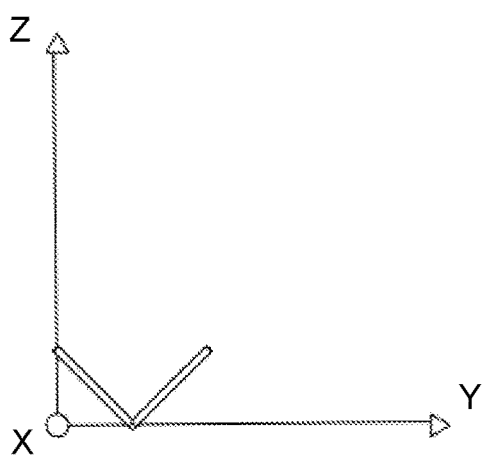
FIG. 15*d* shows a side view of FIGS. 15*a* and 15*b;*

The material properties of each of these control geometries, once produced by the additive manufacturing system 10, are representative of the material properties of regions of interest 102*a*, 102*b*, 102*c*, 102*d*, 102*e*, 102*f* of the metal piece 100 having the same respective build layer as shown in FIG. 6. The different control geometries of the functionalized support can therefore be used as reference geometries to test the quality of different portions of the metal piece at defined heights, to compare different metal pieces with the same build job files or even for metal pieces having different shapes built with the same material.

Figure 17:
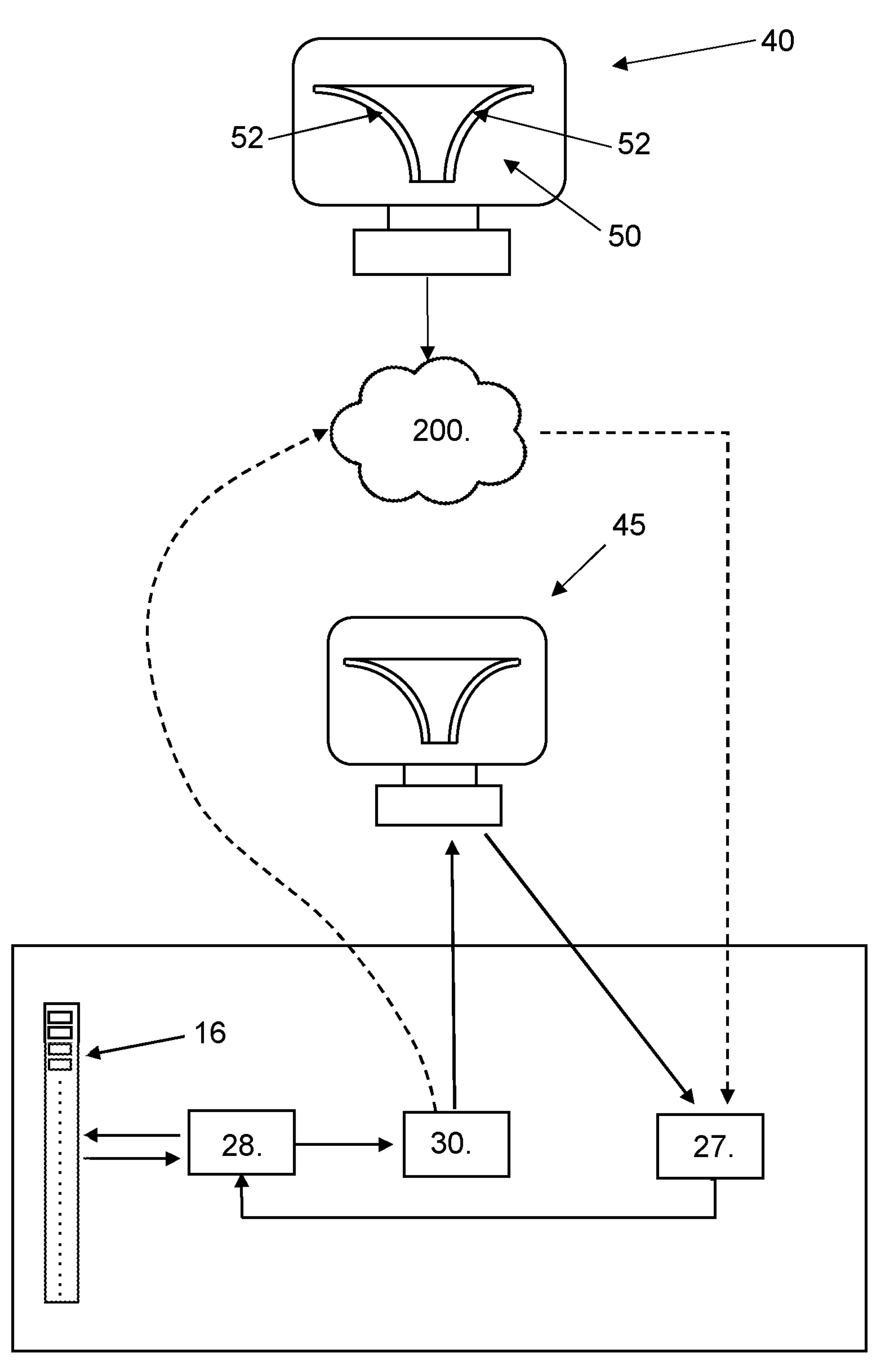
FIG. 17 shows a brock diagram of an additive manufacturing system remotely controlled by a computing device running additive manufacturing software.

Once the additive manufacturing of the metal piece 100 is completed, data on the material property of the regions of interest 102 acquired by the measurement unit 30 are sent to the in-situ computing device 45 or the remote computing device 40 for analyses as shown in FIG. 17.

Referring to FIGS. 7 to 14, control geometries 70 that are distinct from one or more metal pieces 100 may also be designed to be manufactured on the build platform 24 in empty regions 80 which can be selected in the design software in the build volume as a function of the position and/or orientation and the shape of one or more 3D digital models of one or more corresponding metal pieces on the build volume. Different parameters may be measured on the control geometries 70 and/or on the metal piece 100, each corresponding to a defect category such as: surface irregularities, e.g. projections or recesses which are typically measured by optical means; surplus of partly fused material; altered colour, especially for titanium, and/or traces of powder as a sign of insufficient atmosphere protection, which may be measured by optical means; porosity, cracking, lack of fusion and residual stress which can be measured in-situ by NDT sensors, geometric dimension inaccuracy and local displacement or warping due to internal stress which may be measured in-situ with NDT sensors; local conductivity and conductivity variations, which may be measured in-situ with NDT sensors; differences in the microstructure, for instance between fine equiaxed grain and larger columnar grain structures that can be measured with NDT sensors.

In an embodiment, a calibration standard 26 may be included on the trajectory of the recoater 16 or of the sensor supporting structure. The calibration standard is placed in an X, Y-position in a recess on the build platform 24 or on a recess 26 beyond a discharge opening 25 positioned next to the build platform 24, as shown in FIG. 1. The recoater 16 is configured to further move along the Y-axis over the discharge opening 25 to remove the excess of metallic powder 22 for each additional layer. The recoater is further configured to move further along the Y-axis beyond the discharge opening 25 for one or more layers to position the NDT sensors 18 above the calibration standard 26 during the additive manufacturing of the metal piece 100 in order to retrieve one or more calibration data for one or more NTD sensors. The calibration standard, therefore, allows for traceable calibration of the NDT sensors during each build job.

The term "calibration standard" should be interpreted in a broad sense and may refer to a reference block, a calibration block, a reference standard, etc.

The calibration standard 26 comprises one or more calibration features adapted to the type of NDT sensor used. The calibration feature should continuously extend along the X-axis such that the NDT sensors 18 of a given type of the sensor supporting structure 16 may sense identical characteristics when the latter moves across the calibration standard 26 at least once during an additive manufacturing run. Alternatively, several identical calibration features should be located on the path of each NDT sensor 18 of the sensor supporting structure 16.

The calibration standard 26 may advantageously comprise a marking encoding a unique identifier for traceability purposes. The marking is unique in the sense that calibration standards have an identifier allocated uniquely thereto that is sufficient to identify each in a non-ambiguous way. Each calibration standard can therefore be associated with a quality certificate mentioning said unique identifier that proves its fitness for purpose as means of calibration according to a given testing procedure. The marking may be visible and/or readable through electromagnetic means.

In an embodiment, the calibration standard 26 is positioned outside of the build platform 24. It may for example be positioned beyond the build platform in the powder deposition direction. In this embodiment, the calibration standard has an upper surface substantially positioned in a plane coplanar with the plane of the upper surface layer of the metallic powder, i.e., within +/−5 mm in the Z direction of the plane of this upper surface layer, and preferably within +/−1 mm of this plane.

The calibration standard may be placed on the build platform 24 such that the calibration top surface is substantially at the same height as the build platform surface 24*a*. In other words, the calibration standard top surface is substantially coplanar with the build platform surface 24*a*. The height of the top surface of the calibration standard above the build platform surface should in anyway not exceed 1 mm, and should typically be lower than 0.1 mm.

In an embodiment, calibration features are machined directly into the material of the build platform 24. An advantageous machined calibration feature may be a notch with a typical depth of 0.1 to 5 mm created by wire electrical discharge machining (wire EDM) across the top surface of the build platform 24. A machined calibration feature may be advantageously of constant depth in the Z direction, and in an orientation in the X, Y plane such that all NDT sensors can move over it within the travel of the sensor supporting structure.

In another embodiment, a calibration standard is positioned in a recess or hole of the build platform 24 with the advantage of having the choice of materials that may be used to realize the calibration standard. The calibration standard may also be removably attached to the build platform to facilitate the removal of printed metal parts and/or to perform maintenance operations. The calibration standard may be exchanged according to the quality standard used to control a given build job or shared between several build platforms.

A calibration measurement (i.e. a measurement performed when the NDT senor is over the calibration standard) is typically made at least once at the start of the build process (after warmup) and typically several times during the build process and at the end of the build process, in order to obtain a traceable NDT sensor calibration dataset associated with a NDT part control dataset and/or with a reference geometry NDT measurement dataset. Advantageously, the calibration standard may be marked with a unique identification code fed into the in-situ and/or remote computing device, either manually or through an automatic code reader. This unique identification code is stored alongside the calibration dataset and the NDT measurement dataset for traceability purposes.

The NDT sensor may be configured to measure the height of the powder and/or the height of sintered portions (i.e. the surface geometry on the trajectory of the NDT sensor). The calibration standard consists of a reference standard with known geometry, typically comprising height steps in the range of 0.01 to 1 mm as calibration features.

In an advantageous embodiment, the NDT sensor configured to measure the height of the last sintered surface is an eddy current sensor. In another advantageous embodiment, the NDT sensor configured to measure this height is an optical sensor.

With the same type of calibration standard, the NDT sensor may be configured to sense a difference between the powder height before sintering and the sintered layer height.

The NDT sensor may be configured to measure the surface roughness of powder that has been spread in the last layer and/or the surface roughness of sintered portions. In this case, a preferred embodiment of the calibration standard consists of a reference standard with known surface roughness and or surface features typically comprising height variations in the range of 0.001 to 0.1 mm as calibration features, installed within +/−1 mm of the plane created by the recoater.

The NDT sensor may be configured to measure the part density. In this case, the calibration standard is a part of known density made of a similar material as the part being produced, and preferably comprising several parts or portions of known density as calibration features, ideally in the density range achievable by the additive manufacturing system.

In an advantageous embodiment, the NDT sensor configured to measure the density of the calibration standard is an eddy current sensor.

The NDT sensor may be configured to measure the powder density prior to solidification. In this case, the calibration standard comprises, as a calibration feature, a portion with a known metallic powder density that is made of metallic powder solidified with a non-conducting, non-magnetic binder material, and preferably several such parts or portions. These parts or portions should ideally have a metallic powder density within or close to the density range achievable with the powder deposition and recoating mechanism of the system In an advantageous embodiment, the NDT sensor configured to measure the powder density prior to solidification is an eddy current sensor.

The NDT sensor may be configured to measure defects such as porosity, cracking, lack of fusion or residual stress in the metal piece 100 and/or in control geometries 70. In a preferred embodiment, the calibration standard is a piece made of a material similar to that of the printed metal piece, with artificial or natural defects, as calibration features, representative of the defect class searched for. Artificial defects, used as calibration features, may be machined notches to simulate cracks, and/or machined holes to simulate porosity.

The NDT sensor may be configured to measure the local electrical conductivity of the metal piece and/or of the control geometries. In this case, the calibration standard is of known electrical conductivity, preferably within +/−50% of the expected sintered part electrical conductivity. The calibration standard 26 may comprise different portions, for example, a first and a second portion 26*a*, 26*b* of different conductivity.

In an advantageous embodiment, the NDT sensor configured to measure the electrical conductivity of the metal piece is an eddy current sensor.

The NDT sensor supporting structure may be the recoater, the print head or another mobile element crossing the build plate whose motorized motion can make the NDT sensor reach the calibration standard.

Figures 16A, 16B, 16C, 16D:
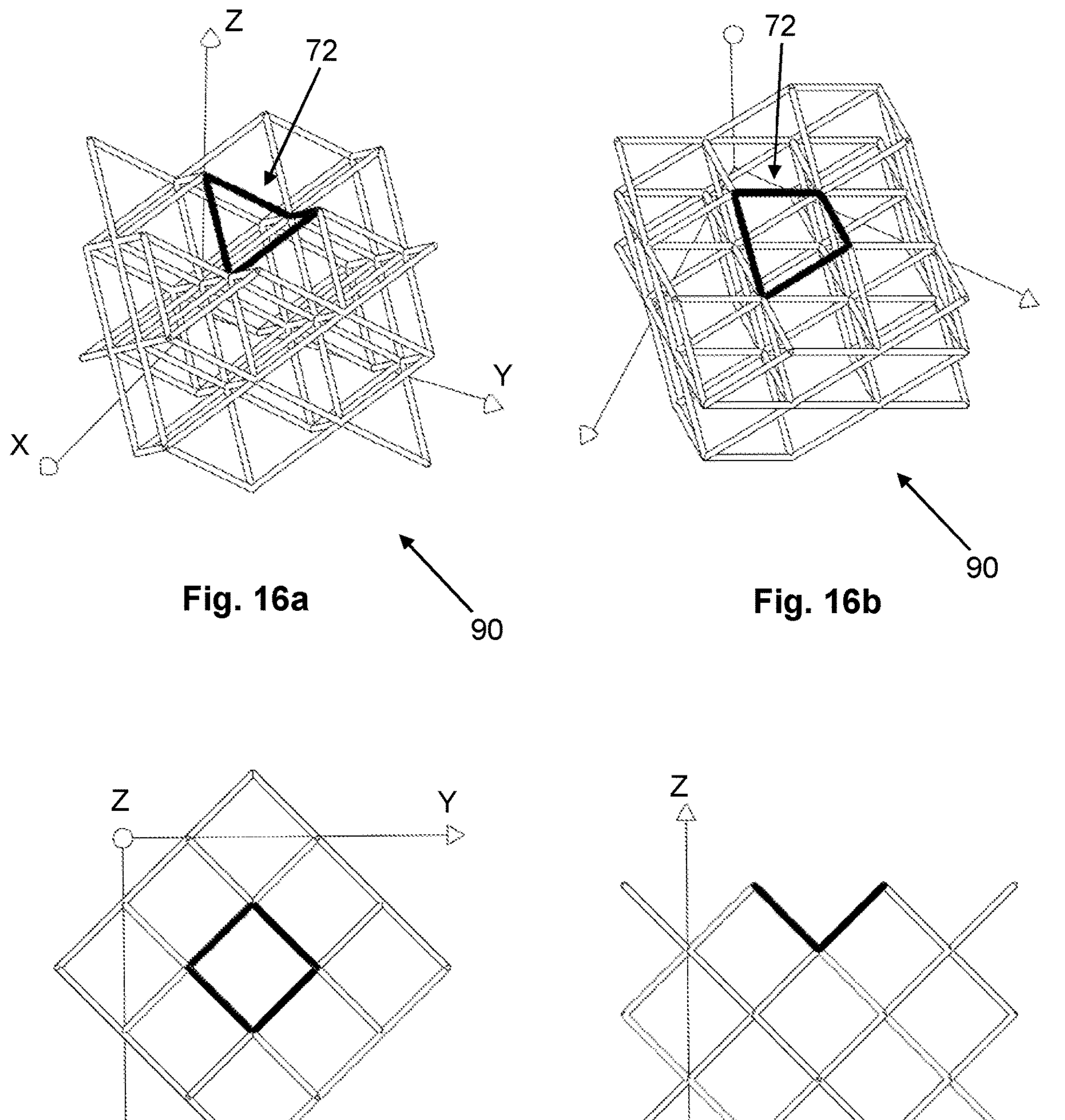
FIG. 16*a* shows a perspective view of a lattice structure integrating the closed loop conducting portion of FIG. 15*a;*
FIG. 16*b* shows another perspective view of the lattice structure of FIG. 16*a*
FIG. 16*c* shows a top view of FIGS. 16*a* and 16*b;*
FIG. 16*d* shows a side view of FIGS. 16*a* and 16*b*.

In an advantageous embodiment, the control geometries 70 can be designed to represent the most challenging portions for additive manufacturing, for instance a wall or a lattice structure 90 as shown for example in FIGS. 16*a*, 16. They may also be placed to be built on a specific location on the build platform 24 in order to take into consideration an area known to be prone to a given defect category, for instance in a region on the built platform 24 where multiple laser beams are close to each other during the additive manufacturing process.

The control geometries can be full cubes or full parallelepipeds, that are suitable for density measurements using Archimedes' method.

The control geometries can be shaped to perform tests of mechanical properties. In particular, the control geometries may exhibit a typical test specimen shaped to be suitable for tensile strength tests, fatigue tests, and/or fatigue crack growth. The fatigue and tensile strength specimens typically exhibit three regions with two cross-sections: The central region, where the failure typically occurs, has a reduced cross-section compared to the extremities which exhibit a larger cross-section. The cross-sectional area, along a plane orthogonal to the longitudinal axis of the specimen, is typically at least 30% larger in the extremities than in the central region. The section typically varies smoothly between the three regions in order to avoid stress concentrations. In the case of tensile strength and fatigue test specimens, the control geometries are also of elongated shape (high aspect ratio), with the central region having a length typically at least five times its width.

The control geometry 70 can be shaped to have a closed conductive portion 72 surrounding an empty space 74 as illustrated in particular in FIGS. 10*a* to 13*a*. In an embodiment, the closed conductive portion 72 may be oriented within a plane parallel to a plane within which the recoater or the sensor supporting structure of the additive manufacturing system is configured to move as shown for example in FIGS. 14*a*, 14*b* where identical control geometries are stacked on top of each other to form a functionalized support 60 having repetitive closed conductive portions at different building layers.

It may however be desirable to have a control geometry with a closed conductive portion extending in different planes, for example to inspect the part quality of an overhang part of a metal piece. The printable threshold overhang angle (PTOA) is the overhang with the lowest angle that can be fabricated without needing support structures while still meeting the part quality requirements. It is defined here as the angle between the XY plane and a surface tangent to the overhang in the XZ (or YZ) plane. Minimizing the PTOA is important, as it reduces the printing and post-processing costs. Documenting that the print quality is achieved for a given PTOA is therefore important.

An advantageous way of doing so is to use a closed conductive portion made of several elongated portions with thin sections extending at an angle substantially matching the PTOA (i.e. the minimum overhang angle of a part of the metal piece achievable with the additive manufacturing system without any supporting structure). This PTOA usually varies between 30° to 45° depending on the parameters of the system. Integrating a control geometry on an overhang part may provide valuable information on the properties of the quality on the overhang part and based on this information the angle may be decreased to optimize the additive manufacturing process. The section of thin portions forming the closed control conductive portion is typically between 0.5 and 5 $mm^2$.

The closed conductive portion 72 of the control geometry may be oriented in several planes and a closed conductive portion may be formed only upon completion of several build layers. An example of such closed conducting portion 72 is illustrated in FIGS. 15*a*-15*d* and is well adapted to be integrated in a lattice structure 90 as shown in FIGS. 16*a*, 16*b* to determine the minimum PTOA to be able to optimize the printing process.

Such kind of control geometries 70 with a closed conductive portion 72 are particularly advantageous to test non-destructively fine structural components with eddy current techniques. In an embodiment of the invention, the NDT sensor is an eddy current sensor comprising a coil 19 generating a time-varying electromagnetic field in the range of 1 kHz to 10 MHz. The dimensions of coil 19 in the X and Y directions are substantially equal to the dimensions of the closed conductive portion 72 of the control geometry 70 in the X and Y directions such that the coil may be aligned with the conduction portion 72.

In another advantageous embodiment, the NDT sensor is an eddy current sensor comprising a coil generating a time-varying (oscillating) electromagnetic field in the range of 1 kHz to 10 MHz by means of at least one coil with characteristic sensing size equal or close to the dimension of the closed conductive portion 72 of the control geometry 70.

The characteristic sensing size of an oscillating electromagnetic field produced by the coil around a certain point of interest located within a plane to be investigated (e.g. produced by a generalized coil at a certain distance from a surface) is the distance between the maxima of the amplitude (norm) of the vector potential (A) corresponding to the generated magnetic field (B) along a line belonging to the plane of interest and passing through the point of interest. For this kind of applications (eddy currents), the Coulomb gauge is used to compute the vector potential. In case of an asymmetrical field, the maximum distance over all lines passing through the point of interest is used as the characteristic sensing size.

The control geometry 70 may be positioned repetitively in lattice-like structures at different heights, either in the metal piece 100 or in support structures (FIG. 6). Identical control geometries 70 with closed conductive portion 72 may also be stacked on top of and/or next to each other to form a lattice-like structure, as shown in FIGS. 14*a* and 14*b*, with repetitive closed conductive portion 72 at different build layers at different heights. The characteristic sensing size of the sensor coil 19 should be within +/−15%, and preferably within +/−5% of the lattice period defined by the distance in the X and/or Y and/or Z directions between closed conductive portions 72. These lattice control geometries can be used to test fine structures or lattice structures used to build the part. Lattice structures have the advantage, among other, to reduce the weight of the component while keeping good mechanical properties.

In an embodiment, the coil is built without ferromagnetic material, and the characteristic sensing size is substantially equal to the size of the coil. In this embodiment, the coil size substantially matches the lattice period and/or the distance between two opposite segments of the closed conductive portion 72 of the control geometry 70.

The coil may also include magnetic elements affecting the magnetic field distribution in order to shape the magnetic field distribution or achieve electromagnetic shielding between elements. In such a case, the actual size of the coil may differ significantly from its characteristic sensing size.

In another advantageous embodiment, the NDT sensor comprises coils that are spaced apart with a distance matching the lattice period within +/−15%, and preferably within +/−5%.

As obvious to someone skilled in the art, the control geometries may need to be attached to the build plate by means of support structures.

The data of the 3D digital model of one or more metal piece which may comprise one or more functionalized supports and control geometries, if any, as described above, are converted by the additive manufacturing software into a build job file. As shown in FIG. 2, the build job file is sent to a control unit 27 of the additive manufacturing system 10. 3D digital models of metal pieces to be produced are preferably designed on a remote computing device 40 as shown in FIG. 17 which transmits the build job file to the control unit 27 of the additive manufacturing system 10 through the internet 200. According to an embodiment, the build job file may also be sent from the remote computing device 40 to an in-situ computing device 45 accessible by the operator of the system 10 which may modify certain parameters to improve the additive manufacturing process.

The build job file comprises data to the regions of interest of the metal piece 100 which need to be inspected during its additive manufacturing process by NDT sensors 18.

These data provide enough information on the quality of the metal piece and can be shared without compromising the know-how of the manufacturer of complex mechanical parts as these data reveal only partial information on the internal structure of the metal piece thereby preventing prejudicial reverse-engineering.

In addition, these data are compliant with certifications standards and can therefore be sent to a certified person for certification of AM products in order to advantageously streamline the certification process.

LIST OF REFERENCES

Additive manufacturing system 10
Laser source 12
Mirror scanner 14
Sensor supporting structure
Reacoater 16 (one embodiment)
NDT sensors 18
Coil 19
Material dispensing platform 20
Metallic powder 22
Build platform 24
Build platform surface 24*a*
Discharge opening 25
Calibration standard 26
First portion 26*a*
Second portion 26*b*
Controller 27
Processor 27*a*
Multiplexer 28
Measurement units 30
Remote computing device 40
In-situ computing device 45
Additive manufacturing software
3D model 50
Regions of interest 52
Functionalized support 60
Control geometries 70*a*, 70*b*, 70*c*, 70*d*, 70*e*, 70*f*
Control geometries 70
Closed conductive portion 72
Empty space 74
Empty region 80
Lattice structure 90
Metal piece 100
Regions of interest 102; 102*a*, 102*b*, 102*c*, 102*d*, 102*e*, 102*f*

The invention claimed is:

1. A method of monitoring metal pieces produced by an additive manufacturing system comprising a build platform, a material dispensing mechanism to dispense metallic powder on the build platform, and a sensor supporting structure configured to move across the build platform, wherein N or M Non-Destructive Testing (NDT) sensors are mounted on the sensor supporting structure next to each other along an axis substantially perpendicular to the direction of the displacement of the supporting structure, the method comprising the steps of:

generating, on a computing device, a 3D digital model of at least one metal piece to be produced by the additive manufacturing system, and identifying regions of interest in the 3D digital model where defects are more likely to occur during the additive manufacturing of said at least one metal piece, wherein said regions of interest are identified using a software configured to check said 3D digital model according to specific design rules;

N NDT sensors being configured to be either:

selectively activated among a total of M NDT sensors, or mounted on the sensor supporting structure at specific locations along said axis, wherein said N NDT sensors are selectively activated or mounted on said specific locations as a function of the regions of interest identified in the 3D digital model in order to retrieve data on the properties of the quality of metal parts of the metal piece only for the corresponding regions of interest of the metal piece during its additive manufacturing.

2. The method of claim 1, wherein said N NDT sensors are selectively activated or mounted on said specific locations also as a function of the position of the sensor supporting structure relative to the build platform.

3. The method of claim 1, wherein said N NDT sensors are selectively activated or mounted on said specific locations also as a function of the position on the build platform where said at least one metal piece is to be manufactured and as a function of the build layer.

4. The method of claim 1, further comprising generating at least one 3D digital model of a functionalized support supporting a part of the 3D digital model of the metal piece, the functional support comprising a plurality of control geometries having different build layers at different heights, wherein the material property of each control geometry, once produced by additive manufacturing, is representative of the material property of a corresponding region of interest of the metal piece supported by said functionalized support, said region of interest belonging to the same build layer of the corresponding control geometry.

5. The method of claim 4, said functionalized support extending in the Z-direction during the additive manufacturing, wherein N NDT sensors are fixedly mounted on said supporting structure next to each other at a location along said axis to be aligned with said functionalized support in order to sense said control geometries during its additive manufacturing.

6. The method of claim 1, wherein the manufacturing system further comprises a multiplexer configured to selectively activate N NDT sensors among said M NDT sensors mounted on the sensor supporting structure, and a control unit configured to control the multiplexer, during the additive manufacturing of the metal piece, as a function of:

the identified regions of interest, the position of the sensor supporting structure on the build platform, and the build layer of the metal piece being manufactured.

7. The method of claim 6, wherein Mis at least 100 and N is comprised between 4 and 16, and wherein N varies for each layer or for some layers constituting the metal piece.

8. The method of claim 6, the control unit comprising a processor, wherein the 3D digital model of the metal piece to be produced is converted into a build job file comprising data of identified regions of interest in the form of program codes, the build job file being sent from the computing device to the control unit to be executed by the processor for causing the control unit to control the multiplexer as a function of the identified regions of interest and as a function of the position of the sensor supporting structure on the build platform.

9. A tangible computer product containing a build job file in the form of program codes to be executed by the processor of the method of claim 8.

10. The method of claim 1, the additive manufacturing system further comprising a calibration standard positioned in the manufacturing system such that said sensor supporting structure may move above the calibration standard, the method further comprising moving said sensor supporting structure one or more times during the additive manufacturing of the at least one metal piece to retrieve one or more calibration data for each of said N NDT sensors.

11. The method of claim 10, wherein the calibration standard comprises one or more calibration features adapted to the type of NDT sensors used, wherein said one or more calibration features either:

continuously extend(s) in a direction parallel to the X-axis of the sensor supporting structure, or are distinct and identical calibration features positioned along said direction in correspondence with the position of the N NDT sensor such that each of said N NDT sensors of a given type of the sensor supporting support may sense identical characteristics when said sensor supporting support moves across the calibration standard.

12. The method of claim 11, wherein said one or more calibration features comprise at least a first and a second portion having respectively a first and a second conductivity that are different.

13. The method of claim 11, wherein said one or more calibration features comprise machined features with at least one characteristic dimension below 0.2 mm, such as a notch, a step, or a hole.

14. The method of claim 10, the additive manufacturing system further comprising a material dispensing platform comprising a bed of metallic powder, said sensor supporting structure being a recoater configured to move the metal powder from the material dispensing platform over the build platform layer by layer, wherein the calibration standard is positioned in the manufacturing system such that the recoater may move above the calibration standard, the method further comprising, during the additive manufacturing of the metal piece, moving the recoater one or more times above the calibration standard during the formation of one or more powder layers on the build platform, or moving the recoater one or more times beyond the build platform above the calibration standard after the formation of one or more corresponding layers, in order to retrieve one or more calibration data for each of said N NTD sensors.

15. The method of claim 14, the additive manufacturing system further comprising a discharge opening positioned between the build platform and the calibration standard, the method comprising moving the recoater further along the Y-axis across the discharge opening to remove the excess of metallic powder for each additional layer spreads across the build platform and, moving the recoater even further beyond the build platform one or more times along the Y-axis to position the NDT sensors above the calibration standard during the additive manufacturing of said at least one metal piece in order to retrieve one or more calibration data for each of said N NTD sensors.

16. The method of claim 10, wherein the calibration standard is either forming an integral part with the build platform or removably included in the build platform, the top surface of the calibration standard being substantially coplanar with the build platform surface.

17. The method of claim 1, wherein said N NDT sensors are eddy current sensors.

18. An additive manufacturing system for additive manufacturing of at least one metal piece and for monitoring said metal piece, the system comprising:

a build platform actuable along a vertical (Z) axis and on which said at least one metal piece is to be manufactured, a material dispensing mechanism for dispensing metallic powder on the build platform, and a sensor supporting structure configured to move across the build platform, wherein NDT sensors are mounted on the supporting structure next to each other along an axis (X-axis) substantially perpendicular to the direction (Y-axis) of the displacement of the sensor supporting structure, wherein said N NDT sensors are configured to retrieve data on the properties of the quality of metal parts of the metal piece corresponding of the regions of interest identified by the method of claim 1.

19. The system of claim 18, further comprising a material dispensing platform comprising a bed of metallic powder and wherein said sensor supporting structure is a recoater configured to move the metallic powder from the material dispensing platform over the build platform layer by layer.

20. The system of claim 19, further comprising a discharge opening for discharging the excess of metallic powder and a calibration standard, wherein the discharge opening is positioned between the build platform and the calibration standard such that the recoater is arranged to move across the discharge opening to remove the excess of metallic powder and then above the calibration standard.

21. The system of claim 18, wherein the recoater comprises at least 100 NDT sensors, the system further comprising a multiplexer configured to selectively activate N NDT sensors among said at least 100 NDT sensors, a control unit configured to control the multiplexer and a measurements unit connected to the multiplexer to retrieved data on the property of the quality of metal parts of the at least one metal piece corresponding to the selected regions of interest of said at least one metal piece.

22. The system of claim 18, wherein NDT sensors are eddy current sensors.

23. A method of monitoring metal pieces produced by an additive manufacturing system comprising a build platform a material dispensing mechanism to dispense metallic powder on the build platform, a sensor supporting structure configured to move across the build platform and a build volume, wherein N or M NDT sensors are mounted on the supporting structure next to each other along an axis (X-axis) substantially perpendicular to the direction of the displacement (Y-axis) of the sensor supporting structure, the method comprising the steps of:

generating, on a computing device, a 3D digital model of the build volume and a 3D digital model, in the build volume, of at least one metal piece (100) to be produced by the additive manufacturing system;

selecting empty regions in the build volume, wherein each empty region has a volume larger than $10\times10\times10$ mm$^3$, and generating 3D digital models of control geometries in the empty regions;

N NDT sensors being configured to be either:

selectively activated among a total of M NDT sensors, or mounted on the sensor supporting structure at specific locations along said axis (X-axis), as a function of the position of said 3D digital models of control geometries in the corresponding empty regions of the 3D digital model of the build volume and as a function of the position on the build platform where said control geometries are to be manufactured in order to retrieve data on the properties of the quality of metal parts of said control geometries during their additive manufacturing without directly sensing the at least one metal piece during its additive manufacturing.

24. The method of claim 23, wherein at least one of said 3D model of control geometries comprises a closed conductive portion surrounding an empty space, the closed conductive portion having a regular width within a building plane, wherein the thickness of said width is equal or thinner than the thickness of the thinnest portion of the 3D digital model of the at least one metal piece.

25. The method of claim 24, wherein NTD sensors are eddy-current sensors comprising each a coil generating a time-varying electromagnetic field within the range from 1 kHz to 10 MHz, and wherein the coil's characteristic sensing size is substantially identical to the dimensions of the closed conductive portion of the control geometry.

26. The method of claim 23, wherein said 3D digital models of control geometries have a maximum thickness of one millimetre and the corresponding manufactured control geometries are made of one or more layers selected from 1 to 30.

27. The method of claim 23, wherein each control geometry has at least one support structure linking said control geometry to the build plate and wherein the support structure has on average a total sectional area in the build direction of no more than 20% of that of the reference geometry.

28. A method of monitoring metal pieces produced by an additive manufacturing system comprising a build platform, a material dispensing mechanism to dispense metallic powder on the build platform, a sensor supporting structure configured to move across the build platform, and a build volume, wherein N or M NDT sensors are mounted on the supporting structure next to each other along an axis (X-axis) substantially perpendicular to the direction of the displacement (Y-axis) of the sensor supporting structure, the method comprising the steps of:

generating, on a computing device, a 3D digital model of the build volume comprising at least one metal piece to be produced by the additive manufacturing system and one or more support structures supporting one or more parts of said at least one metal piece, and including in at least one support structure at least one control geometry;

N NDT sensors being configured to be either:

selectively activated among a total of M NDT sensors, or mounted on the sensor supporting structure at specific locations along said axis (X-axis), wherein said N NDT sensors are selectively activated or mounted on said specific locations as a function of the location of the control geometries in one or more of said support structures in the 3D digital model of the build volume in order to retrieve data on the properties of the quality of the control geometries included in at least one support structure during its manufacturing.

29. The method of claim 28, wherein said N NDT sensors are selectively activated or mounted on said specific locations also as a function of the position of the sensor supporting structure on the build platform.

30. A method of monitoring metal pieces produced by an additive manufacturing system comprising a build platform, a material dispensing mechanism to dispense metallic powder on the build platform, a sensor supporting structure configured to move across the build platform, and a build volume, wherein NDT sensors, are mounted on the supporting structure along an axis (X-axis) substantially perpendicular to the direction of the displacement of the sensor supporting structure (Y-axis), the method comprising the steps of:

generating, on a computing device, a 3D digital model of the build volume comprising at least one metal piece to be produced by the additive manufacturing system, identifying regions of interest in the 3D digital model of the at least one metal piece where defects are more likely to occur during the additive manufacturing of said at least one metal piece, wherein said regions of interest are identified using a software configured to check said 3D digital model according to some specific design rules, and modifying in the 3D digital model of the build volume the position and/or orientation of the 3D digital model of the at least one metal piece so as to maximize the number of regions of interest that are located on an axis parallel to the X-axis of the sensor supporting structure before starting the additive manufacturing of said at least one metal piece;

wherein N NDT sensors are configured to be either:

selectively activated among a total of M NDT sensors, mounted on the sensor supporting structure at specific locations along said axis (X-axis), in order to retrieve data of the properties on the quality of metal parts for an optimized number of corresponding regions of interest of the metal piece during its additive manufacturing.

31. A method of monitoring metal pieces produced by an additive manufacturing system comprising a build platform, a material dispensing mechanism to dispense metallic powder on the build platform, and a sensor supporting structure configured to move across the build platform, and at least one NDT sensor affixed to the sensor supporting structure, wherein the NDT sensor moves above a calibration standard several times during the additive manufacturing of a metal piece to perform calibration measurements on the calibration standard and retrieve, based on said calibration standard, a calibration dataset associated with an additive manufacturing run.

32. The method of claim 31, wherein the (Z) height of the top surface of the calibration standard is within +/−5 mm of the Z position of the plane corresponding to the upper surface layer formed by the material dispensing mechanism.

33. The method of claim 31, wherein the calibration standard is either forming an integral part with the build platform or removably included in the build platform, the top surface of the calibration standard being substantially coplanar with the build platform surface.

34. The method of claim 31, wherein calibration standard is marked with a unique identifier that is visible and/or readable through electromagnetic means.

35. The method of claim 31, wherein the NDT sensor is an optical sensor.

36. The method of claim 31, wherein the NDT sensor is an eddy current sensor.

37. The method of claim 31, wherein the calibration standard comprises regions with different conductivities.

38. The method of claim 31, wherein the calibration standard comprises machined features with at least on characteristic dimension below 0.2 mm, such as a notch, a step, or a hole.

39. The method of claim 31, wherein a powder evacuation hole or recess is located between the build platform and the calibration standard.

* * * * *